(12) United States Patent
Wan et al.

(10) Patent No.: US 8,406,154 B2
(45) Date of Patent: Mar. 26, 2013

(54) METHOD AND APPARATUS FOR TOPOLOGY AGGREGATION AND ROUTING CONTROLLER

(75) Inventors: Peng Wan, Shanghai (CN); Wenhua Jiao, Shanghai (CN)

(73) Assignee: Alcatel Lucent, Paris (FR)

( * ) Notice: Subject to any disclaimer, the term of this patent is extended or adjusted under 35 U.S.C. 154(b) by 54 days.

(21) Appl. No.: 12/735,732

(22) PCT Filed: Apr. 10, 2008

(86) PCT No.: PCT/CN2008/000741
§ 371 (c)(1),
(2), (4) Date: Aug. 12, 2010

(87) PCT Pub. No.: WO2009/124419
PCT Pub. Date: Oct. 15, 2009

(65) Prior Publication Data
US 2011/0080851 A1    Apr. 7, 2011

(51) Int. Cl.
*H04L 12/407* (2006.01)
(52) U.S. Cl. .................. 370/255; 370/406; 709/238
(58) Field of Classification Search .......... 370/254–258, 370/406; 709/238
See application file for complete search history.

(56) References Cited

U.S. PATENT DOCUMENTS

| 7,639,688 | B2 * | 12/2009 | Filsfils et al. ................ 370/392 |
| 2004/0228323 | A1 * | 11/2004 | Acharya et al. ............... 370/351 |
| 2005/0007951 | A1 * | 1/2005 | Lapuh et al. ................. 370/225 |
| 2007/0300239 | A1 * | 12/2007 | Adam et al. .................. 719/320 |
| 2010/0061231 | A1 * | 3/2010 | Harmatos et al. ............ 370/228 |

OTHER PUBLICATIONS

Peng Wan et al; A Novel Topology Aggregation Method for Hierarchical Routing in ASON Networks; Date of Conference Nov. 26-30, 2007; IEEE Globecom 2007; pp. 2275-2279.

* cited by examiner

*Primary Examiner* — Dang Ton
*Assistant Examiner* — Mewale Ambaye
(74) *Attorney, Agent, or Firm* — Carmen Patti Law Group, LLC

(57) ABSTRACT

The present invention provides a method and an apparatus for topology aggregation and a routing controller. The method comprises: obtaining a link-diversity path number $c(i,j,\lambda_k)$ between each pair of border nodes in a real topology $G_R$; and obtaining a connectivity matrix C by utilizing said link-diversity path number $c(i,j,\lambda_k)$ and constructing a corresponding full-mesh topology $G_B$. Moreover, the method further comprises compressing the resulting full-mesh topology into a bi-directional shuffle-net topology using the genetic algorithm. Therefore, according the present invention, more link information can be provided for routing decision and more accurate topology can be provided.

12 Claims, 10 Drawing Sheets

Cross-over

Mutation

METHOD AND APPARATUS FOR TOPOLOGY AGGREGATION AND ROUTING CONTROLLER

FIELD OF THE INVENTION

The present invention relates to the network technology, and more particularly, to a method and an apparatus for topology aggregation and a routing controller.

BACKGROUND OF THE INVENTION

Multiple routing domains are unexceptionally included in the IP network, the ATM (Asynchronous Transmission Mode) network or the emerging ASON
(Automatic Switched Optical Network).

For the sake of scalability and security, internal topology information of each routing domain can be advertised to other routing domains in the network only after being aggregated by means of some topology aggregation method. Thus, each routing domain only maintains its own detailed topology information as well as aggregated topology information of other routing domains, thereby reducing the amount of information needing to be advertised and stored in the network.

Generally, a topology aggregation process includes firstly constructing a full-mesh topology composed of border nodes based on a real topology, and further compressing, which is optional, the full-mesh topology into a sparser topology, such as a star topology, a tree topology and the like.

FIG. 1 shows an example of a topology aggregation process. As shown in FIG. 1, topology 100 is a real topology comprising eight nodes 1-8, ten links, and two working wavelengths $\lambda_1$ and $\lambda_2$. In FIG. 1, the Nodes 1-4 are border nodes connected to external peer domains, the Nodes 5-8 are internal nodes, the solid line/the dashed line between nodes indicates the wavelength $\lambda_1/\lambda_2$ path of the link is free and a new connection can be established.

During the topology aggregation, internal nodes of topology 100 are concealed, and only border nodes 1-4 and resource availability therebetween are reserved. The connectivity relation among these four border nodes can be represented by a connectivity matrix as shown in formula (1).

$$\text{Matrix}(\lambda_1) = \begin{bmatrix} - & 0 & 1 & 1 \\ 0 & - & 0 & 0 \\ 1 & 0 & - & 1 \\ 1 & 0 & 1 & - \end{bmatrix}, \text{Matrix}(\lambda_2) = \begin{bmatrix} - & 1 & 1 & 0 \\ 1 & - & 1 & 0 \\ 1 & 1 & - & 0 \\ 0 & 0 & 0 & - \end{bmatrix} \quad \text{formula (1)}$$

Topology 101 shown in FIG. 1 has 4 border nodes 1-4, and thus the connectivity among border nodes can be represented by a 4×4 matrix for each wavelength $\lambda_1$ and $\lambda_2$. If there is a logical link enabling two border nodes to be connected (for example, node 1 and node 4 can be connected with each other through wavelength $\lambda_1$ path 1-5-6-3-4), the corresponding element of the matrix is set to 1, and 0 otherwise.

Topology 101, which includes only border nodes 1-4, is a full-mesh topology constructed in accordance with the connectivity matrix. It can be seen that the number of links is reduced to 5 after the full-mesh topology construction (in the worst case, the number of links is 6, i.e., all nodes are connected).

Topology 102 is the resultant topology after further compressing the topology 101. The redundant logical links in the former topology 101 are deleted, for example, the logical link of wavelength $\lambda_1$ between node 3 and node 4 is replaced with the path 3-1-4, and the logical link of wavelength $\lambda_2$ between node 2 and node 3 is replaced with the path 2-1-3. After compressing, the total number of links is further reduced to 3.

The existing topology aggregation technology is designed for the ATM network. There are three familiar methods, including the symmetric-node approach, the full-mesh approach and the star approach. The main idea of the symmetric-node approach is that all border nodes of the real topology are merged into a single virtual node and the connection property between border nodes is represented by a certain common value. The advantage of this approach is that only a very little amount of information needs to be exchanged. However, the disadvantage is that the provided information is too rough and inaccurate excessively, which will cause that the intra-domain resources can't be utilized appropriately. The full-mesh approach aims at the accuracy of the aggregation information. It assumes that all border nodes of the real topology are full connected by logical links, each of which is configured with one or more QoS parameters, such as delay or bandwidth. This approach reserves the connectivity property between border nodes of the original real topology accurately. However, because it must maintain the information of N(N-1)/2(N is the number of border nodes) logical links, when the network size is relatively large, the scalability is poor. The star approach assumes that there is a virtual node in the center, and all the border nodes in real topology are connected to it by logical links. Furthermore, each logical link may have different property. Thus, the star approach can represent more detailed link information, and may be much more accurate than the symmetric-node approach. At the same time, the star approach only needs to maintain the information of N logical links, and thus has better scalability than the full-mesh approach and is suitable for a relatively larger network.

However, when the above-mentioned topology aggregation methods designed for the ATM network are applied to the optical network, these methods will be too rough and inaccurate to reach a good performance as a condition of wavelength continuity constraint needs to be met. Therefore, a more suitable solution for topology aggregation is required for the optical network such as ASON.

SUMMARY OF THE INVENTION

To this end, it is an object of the present invention to provide a solution for topology aggregation more suitable for the optical network.

According to an aspect of the present invention, there is provided a method for topology aggregation, comprising:
obtaining the link-diversity path number $c(i,j,\lambda_k)$ between each pair of border nodes in a real topology $G_R$; and
obtaining a connectivity matrix C by utilizing said link-diversity path number $c(i,j,\lambda_k)$ and constructing a corresponding full-mesh topology $G_B$.

According to another aspect of the present invention, there is provided an apparatus for topology aggregation, comprising:
link-diversity path number obtaining means configured to obtain the link-diversity path number $c(i,j,\lambda_k)$ between each pair of border nodes in a real topology $G_R$;
topology constructing means configured to obtain connectivity matrix C by using said link-diversity path number $c(i,j,\lambda_k)$ and construct a corresponding full-mesh topology $G_B$.

According to another aspect of the present invention, there is provided a routing controller, comprising: the apparatus for topology aggregation as described above; and link-state sending means configured to generate the Link-State Advertisement LSA information based on the topology obtained by the apparatus for topology aggregation, and send said LSA information out.

More link information for routing decision and more accurate topology can be provided according the present invention.

BRIEF DESCRIPTION ON THE DRAWINGS

Other objects and effects of the present invention will be more apparent and easy to understand upon the comprehensive understanding of the present invention from the following detailed description, taken with reference to the drawings, wherein.

The Like reference number indicates the same, similar, or corresponding features or functions throughout the drawings mentioned above.

DESCRIPTION OF THE PREFERRED EMBODIMENTS

Hereinafter, the present invention will be described in detail by means of specific embodiments with reference to the drawings.

Figure 1:
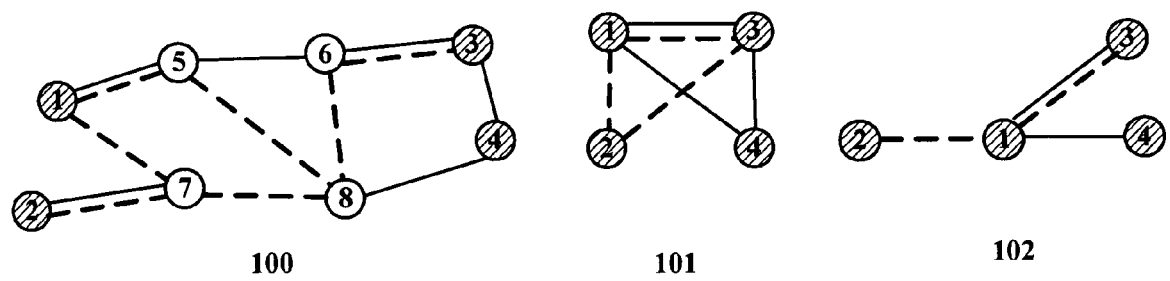
FIG. 1 shows an example of a topology aggregation process according to the prior art.
Figure 2:
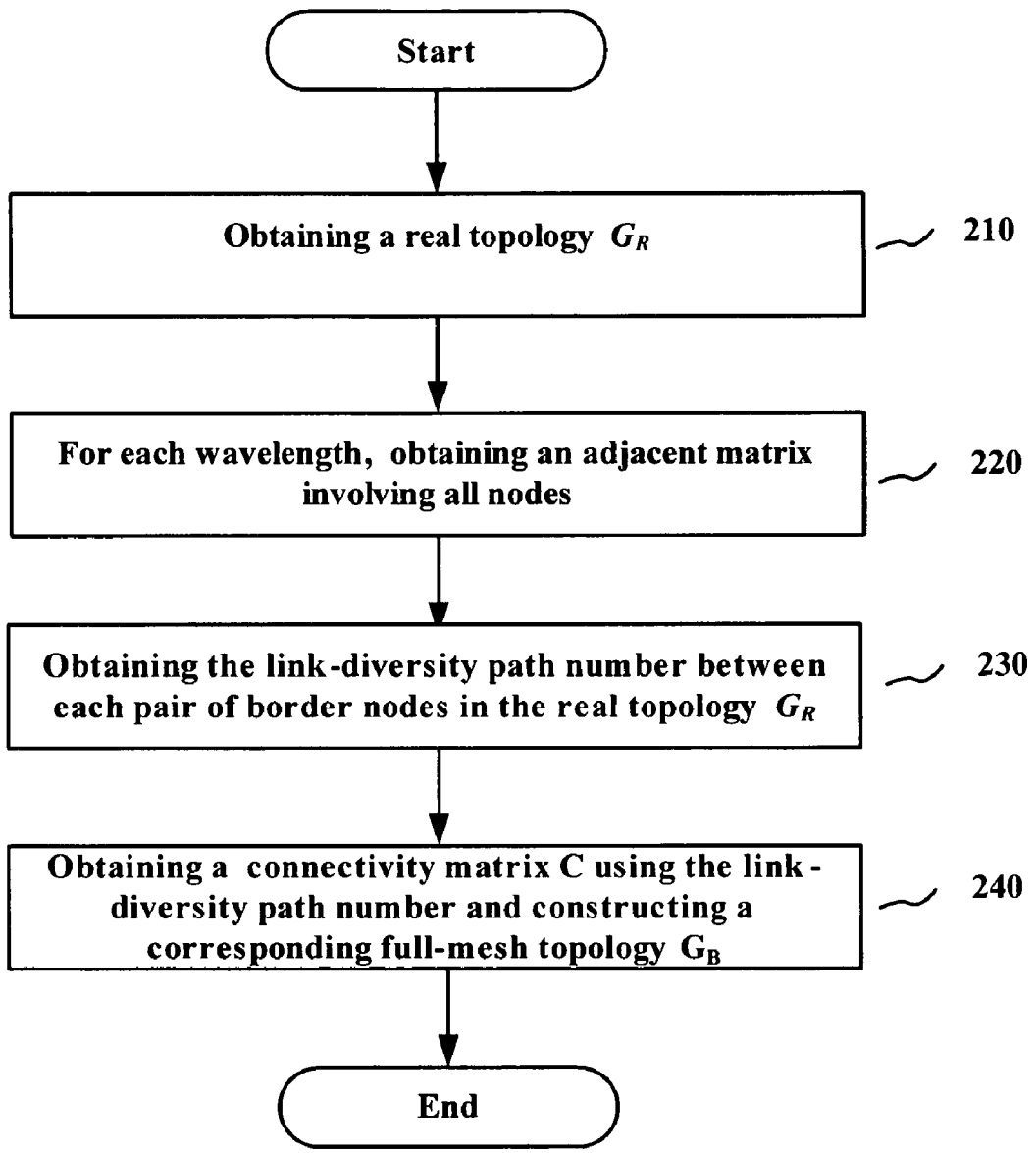
FIG. 2 shows a flow chart of a method for topology aggregation according to an embodiment of the present invention.

FIG. 2 shows a flow chart of a method for topology aggregation according to an embodiment of the present invention. In the following description of embodiments of the present invention, the topology aggregation is directed to one domain in AOSN.

As shown in FIG. 2, firstly, a real topology of the domain is obtained at step 210.

$$G_R=(V, E) \quad \text{formula (2)}$$

Wherein, V represents the set of nodes in the topology, i.e., $V=\{v_1, v_2, \ldots, v_n\}$, and E represents the set of links among nodes, i. e., $E=\{e_1, e_2, \ldots, e_m\}$ and wherein each link can support one or more of wavelengths $\lambda_1, \lambda_2, \ldots, \lambda_W$, n is the total number of nodes, and m is the total number of links, and W is the total number of wavelengths. It should be noted that $G_R$ can be a multi-graph wherein there are multiple optical fiber links between two nodes.

Next, at step 220, for each of wavelengths $\lambda_1, \lambda_2, \ldots, \lambda_W$, an adjacent matrix which involves all nodes is obtained:

$$R_{\lambda_k}=[r(i,j,\lambda_k)]_{n \times n} \quad \text{formula (3)}$$

wherein (i, j=1, ..., n, k=1, ..., W). For the wavelength $\lambda_k$, $r(i,j,\lambda_k)$=the number of links if one or more links exist between node i and node j, and $r(i,j,\lambda_k)$=0 otherwise.

Next at step 230, the link-diversity path number $c(i,j,\lambda_k)$ between each pair of border nodes is obtained from the adjacent matrix $R_{\lambda_k}$. The term "link-diversity path" used herein indicates a path without any shared links between two border nodes.

In an embodiment, computing the link-diversity path number between two border nodes is turned into computing maximum flow between two border nodes, as the link-diversity path number between two border nodes equals to the maximum flow between a source and a destination in the canal network. Thus, in this embodiment, the link-diversity path number between two border nodes is computed by calculating the maximum flow between them by utilizing a maximum flow algorithm.

$$c(i,j,\lambda_k)=\text{MAXFLOW}(i,j,R_{\lambda_k}) \quad \text{formula (4)}$$

In an embodiment, the maximum flow between two border nodes is calculated by utilizing the existing highest-label-preflow-push algorithm. In an alternative embodiment, the maximum flow between two border nodes is calculated using the Augmenting Path Algorithm.

Then, at step 240, the connectivity matrix C is obtained by using the link-diversity path number $c(i,j,\lambda_k)$ and a corresponding full-mesh topology $G_B$ is constructed. Wherein:

$$C=[c(i,j,\lambda_k)]_{N \times N \times W} \quad \text{formula (5)}$$

$$G_B=(V_B, E_B) \quad \text{formula (6)}$$

wherein, $M=N(N-1)/2$, $V_B=\{v_1, v_2, \ldots, v_N\}$, $E_B=\{e_1, e_2, \ldots, e_M\}$, $e(i,j,\lambda_k)=c(i,j,\lambda_k)_o$ From the above embodiment, it can be seen that the connectivity matrix C of the present invention is different from the conventional one shown in formula (1). Instead of being represented by 0 and 1, the connectivity matrix of the present invention is represented by the link-diversity path number between two border nodes. By constructing the connectivity matrix C using the link-diversity path number, not only information on available wavelengths is provided, but also resources information on the wavelengths is provided. Thus, the more abundant information can be used for helping the selection of the optimal path, and the performance can be improved. For example, when a connection is setup, it is preferred to use the wavelength which has more resource and has less possibility to be exhausted.

In another preferred embodiment, the resulting full-mesh topology is further compressed to obtain a sparser topology so that the amount of information to be exchanged among domains is further reduced.

Figure 3:
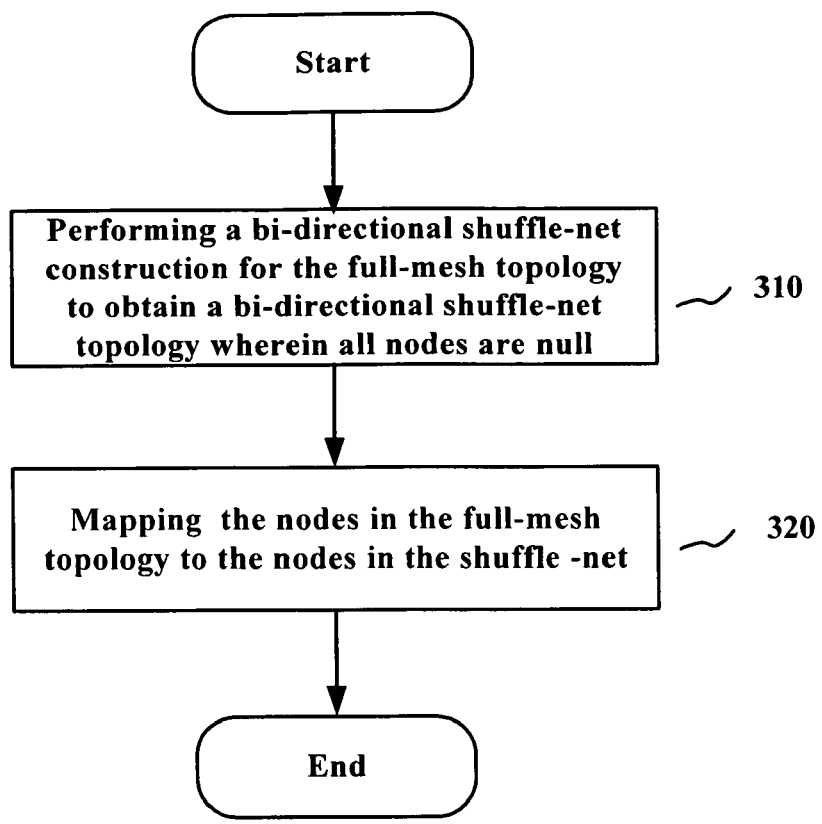
FIG. 3 shows a flow chart of a topology compression process according to an embodiment of the present invention.

FIG. 3 shows a flow chart of a topology compression process according to an embodiment of the present invention. As shown in FIG. 3, at step 310, for the full-mesh topology, a bi-directional shuffle-net construction is performed to obtain a bi-directional shuffle-net topology in which all nodes are null.

A conventional shuffle-net (P, K) topology is a net which has $N'=KP^K$ nodes (P, K=1, 2, ... ) arranged in K columns and $P^K$ rows. Among others, each node in each column has P direct links to nodes in the next column, and the nodes in the last column also link to the nodes in first column so that a cylinder topology is formed. That is to say, the node (l, n) (l=0, 1, ..., $P^K-1$, n=0, 1, ..., K-1) has P direct links to (l', n'), (l', n'+1), ..., (l', n'+P-1) in the next column, where l'=l mod $P^K-1$, n'=(n+1) mod K. The bi-directional shuffle-net topology is an extended version of the shuffle-net. The bi-directional shuffle-net topology is different from the conventional shuffle-net topology in that its links are all bi-directional, that is to say, each node in each column not only has P links to nodes in the next column, but has P links to nodes in the previous column.

Figure 4:
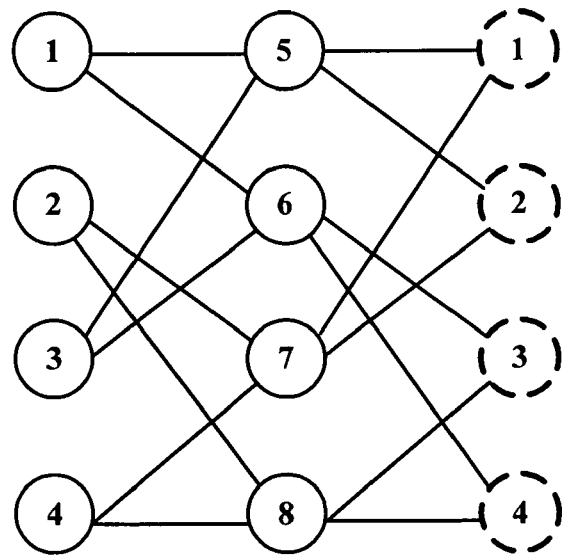
FIG. 4 shows an example of a bi-directional shuffle-net topology.

FIG. 4 shows an example of a bi-directional shuffle-net topology, wherein K=2, P=2, N'=8. As shown, the 8 nodes are arranged in 2 columns and 4 rows. Each node in each column has 2 links to the next and previous column respectively. With the bi-directional shuffle-net topology, logical links number can be reduced to PN' which is significantly reduced than that of the full-mesh topology which is the order of $N^2$, thereby reducing the amount of the link information needing to be flooded and alleviating the load of the signaling network.

In the following, a process of the bi-directional shuffle-net topology construction of the present invention will be described in detail with reference to FIG. 5.

Figure 5:
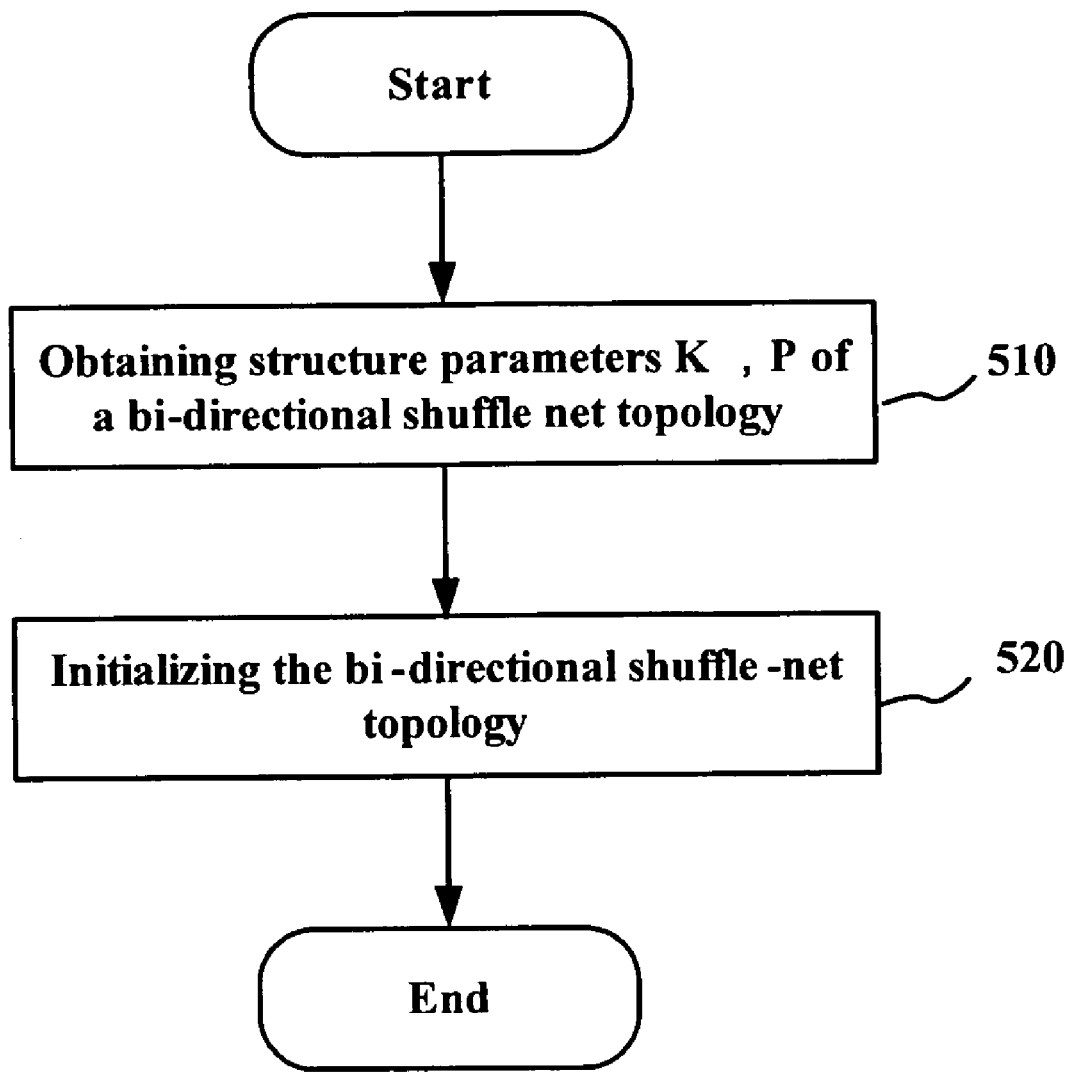
FIG. 5 shows a flow chart of a process of aggregating into a bi-directional shuffle-net topology according to an embodiment of the present invention.

As shown in FIG. 5, first at step 510, parameters K and P of the bi-directional shuffle-net topology are computed for the full-mesh topology, wherein K and P can be solved by the following formula:

$$\text{Max}\{(K-1)P^{K-1}, K(P-1)^K\} < N \leq KP^K (K, P \geq 2) \quad \text{formula (7)}$$

wherein N is the number of nodes in the full-mesh topology, i.e., the number of border nodes in the real topology.

Next, at step 520, the bi-directional shuffle-net topology is initialized by utilizing the parameters K and P obtained from formula (7), in order to obtain an initialized bi-directional shuffle-net topology:

$$G'=(V', E') \quad \text{formula (8)}$$

wherein, V' is the set of nodes in the bi-directional shuffle-net topology, i.e., $V'=\{v'_1, v'_2, \ldots, v'_{N'}\}$, and E' is the set of links in the bi-directional shuffle-net topology, i.e., $E'=\{e'_1, e'_2, \ldots, e'_{M'}\}$, $e'_l=\{\lambda'_1, \lambda'_2, \ldots, \lambda'_W\}$, with $N'=KP^K$, $M'=KP^{K+1}$, $V' \supseteq V_B$, and $E' \supseteq E_B$ Back to FIG. 3, at step 320, the nodes in the full-mesh topology are mapped to nodes in the shuffle-net by means of a certain mapping relation, and corresponding logical link attributes are imparted to the bi-directional links in the shuffle-net.

Figure 6:
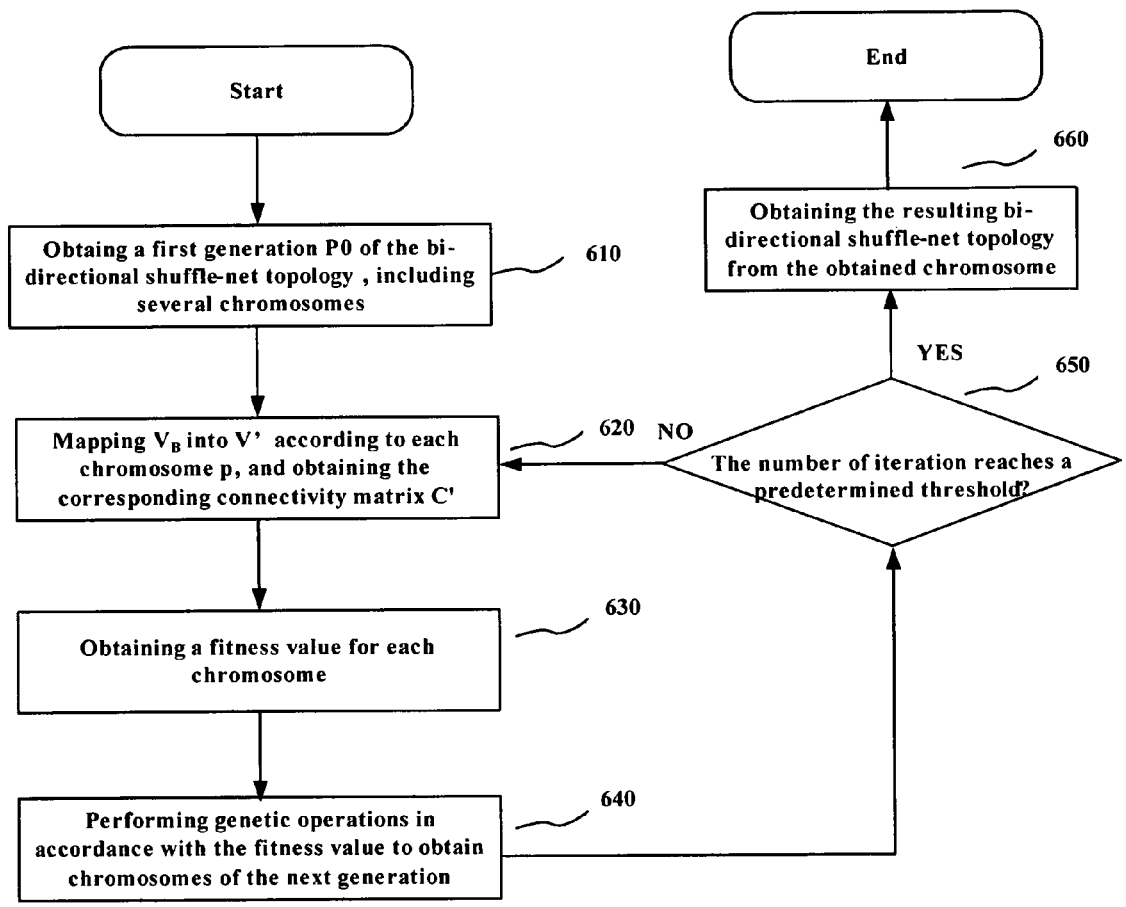
FIG. 6 shows a flow chart of a process of optimizing a bi-directional shuffle-net topology according to an embodiment of the present invention.

FIG. 6 shows a flow chart of a process of optimizing a bi-direction shuffle-net topology according to an embodiment of the present invention. In the embodiment, the Genetic Algorithm (GA) is used for optimizing the bi-direction shuffle-net topology.

As shown, at step 610, the first generation P0 of the bi-direction shuffle-net topology is first obtained, which includes several chromosomes that can represent the way by which the nodes of the full-mesh topology are arranged in the bi-direction shuffle-net topology. In an embodiment, the one-dimensional literal permutation encoding is used to construct the chromosomes. For example, the chromosomes of the first generation P0 can be obtained by permuting N' nodes randomly:

$$p = \text{random permutation}(1, 2, \ldots, N') p \square P_0 \quad \text{formula (9)}$$

Figure 7:
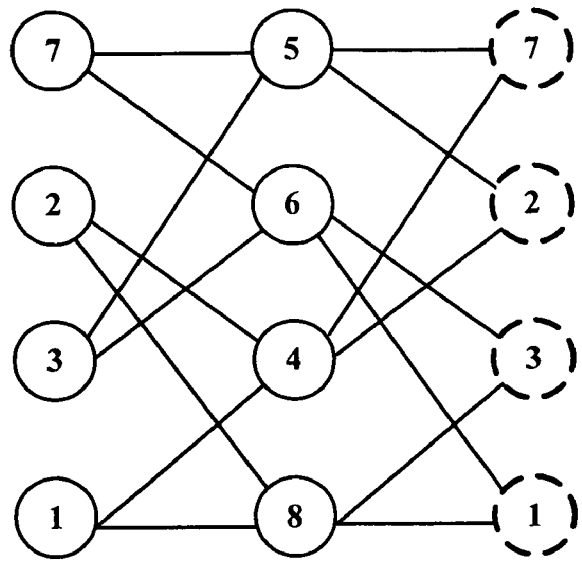
FIG. 7 shows how to map nodes in a full-mesh topology to a bi-directional shuffle-net.

Taking a full-mesh topology of which the number of nodes is 7 as an example, a bi-directional shuffle-net topology with K=2, P=2 and N'=8 is obtained by the aforesaid initializing operation. For a randomly generated chromosome '7 2 3 1 5 6 4 8', it represents the order according to which each node of the full-mesh topology is arranged in the bi-directional shuffle-net (wherein node 8 is a virtual node that is filled for making up the deficiency), i.e., node 7 in the full-mesh topology corresponds to the node (0, 0) in the bi-directional shuffle-net, node 2 corresponds to the node (1, 0), ..., node 4 corresponds to the node (2, 1), and virtual node 8 corresponds to the node (3, 1), as shown in FIG. 7.

It can be seen that the chromosomes in the present invention are different from those ordinarily composed of 0-1 bit sequence. The present invention utilizes the one-dimensional literal permutation encoding, wherein each gene is the node number. Therefore, mutation operation on chromosomes of the present invention is position-based, which usually changes the position of genes in the chromosomes, thus it is ensured that the next generation can inherit most characteristics from their parents and compatible genes can be reserved.

Next, at step 620, after all nodes $V_B$ of the full-mesh topology $G_B$ is mapped into nodes V' of the bi-direction shuffle-net topology G' in accordance with each chromosome p, the mapping of logical links can be performed according to the node positions. As in the bi-directional shuffle-net topology mentioned above, node 7 is connected to node 4, 5, and 6, thus the bi-directional logical links (4, 7), (5, 7), (6, 7) are reserved, and other logical links connected with node 7 are all deleted. Node 8 is a virtual node and doesn't participate in the mapping of logical links. For purpose of evaluating each chromosome, we can obtain a corresponding connectivity matrix C' of the bi-directional shuffle-net topology G':

$$C' = [c'(i,j,\lambda_k)]_{N \times N \times W} \quad \text{formula (10)}$$

The connectivity matrix C' can be obtained in a manner similar to obtain the connectivity matrix C.

At step 630, a fitness value of each chromosome then is obtained with the connectivity matrix of border nodes of the real topology as a target function, which is:

$$\text{Fitness} = -\sum_{\lambda=1}^{W} \sum_{i,j=1}^{N} \text{devation}(i, j, \lambda_k) \quad \text{formula (11)}$$

wherein:

$$\text{deviation}(i, j, \lambda_k) = \begin{cases} 0, & c'(i, j, \lambda_k) = c(i, j, \lambda_k) \\ 1 & c'(i, j, \lambda_k) = 0 \text{ or } c(i, j, \lambda_k) = 0 \\ \left|\frac{c'(i, j, \lambda_k) - c(i, j, \lambda_k)}{c'(i, j, \lambda_k) + c(i, j, \lambda_k)}\right| & \text{others} \end{cases} \quad \text{formula (12)}$$

In formula (11), the fitness value represents the degree of approximation between the connectivity matrix of the full-mesh topology and the connectivity matrix of the topology of the chromosome, the value of which is the opposite of the sum of the degree of deviation. The minus indicates that the smaller the deviation value is, the larger the fitness value is. The deviation value can be the absolute value of the ratio of the difference to the sum between the connectivity matrix of the topology of the chromosome and the target connectivity matrix. In an alternative embodiment, the deviation value is the absolute value of the difference between the connectivity matrix of the topology of the chromosome and the target connectivity matrix.

Figure 8:
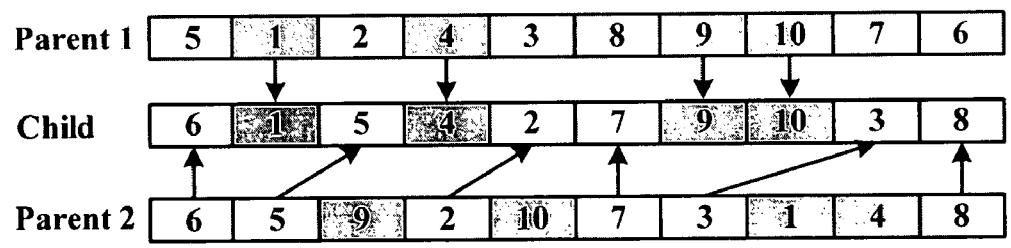
FIG. 8 shows an example of crossover and mutation operations according to an embodiment of the present invention.
Figure 8:
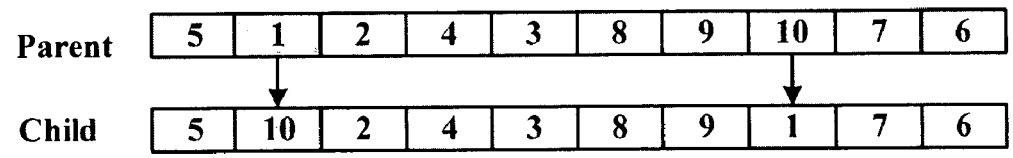

Next, at step 640, genetic operation is performed based on the obtained fitness value to obtain chromosomes of the next generation. In an embodiment, a selection operation is first performed on the chromosomes of the current generation based on the obtained fitness value to obtain the chromosomes for propagating the next generation. That is to say, the chromosome with a lower fitness value (for example, a fitness value lower than a threshold) is culled out, and only the chromosome with a higher fitness value is selected into the next generation. Cross-over and mutation operations are performed on the selected chromosomes to obtain the chromosomes of the next generation. FIG. 8 shows an example of crossover and mutation operations according to an embodiment of the present invention. It should be appreciated that the present invention is not limited to the crossover and mutation operations shown in FIG. 8.

Then, at step 650, it is determined whether the number of the iteration reaches a predetermined threshold or not. If the answer is yes, the resulting chromosome with the best fitness is taken as the optimization result at step 660, that is to say, the optimized bi-directional shuffle-net topology is obtained. If the answer is no, the process proceeds to step 620, and continues the iteration.

In another embodiment, the genetic operations are terminated if the fitness value of a chromosome reaches a predetermined threshold before the predetermined threshold for the number of the iteration is reached, and the bi-directional shuffle-net topology where the nodes are arranged and connected in accordance with the obtained chromosome, is taken as the resulting topology.

The number of iteration can be determined based on need. The more the number of iteration is, the better the obtained result is, but more time is required to compute.

The inventor has verified that the average deviation of each generation decreases quickly in the initial phase and reaches to a stable value after about 20 generations. After that, the average deviation fluctuates in a certain range. The average deviation after 30 generations is substantially smaller than 20%, and the optimal individual deviation is substantially about 10%. It can bee seen that the topology aggregation method of the present invention can achieve a more accurate topology and thus can provide more accurate and abundant information for routing decision, and thus can improve the performance.

Furthermore, other suitable algorithms known to the skilled in the art, such as the heuristic algorithm and the like, can also be used to optimize the bi-directional shuffle-net topology.

It can be seen from the description with reference to FIGS. 3 to 8, that the topology aggregation method of the present invention provides detailed link information suitable for the optical network. More particularly, by employing the genetic algorithm to optimize the bi-directional shuffle-net topology, the more accurate topology structure is described using less logical links, and thus the performance is improved.

In another alternative embodiment, the nodes with more link-diversity path number in the full-mesh topology are mapped into nodes connected directly in a shuffle-net topology using the obtained connectivity matrix of the full-mesh topology, thereby compressing the full-mesh topology into a bi-directional shuffle-net topology using the heuristic approach.

In still another alternative embodiment, the full-mesh topology is compressed into a symmetric-star topology by utilizing the obtained connectivity matrix of the full-mesh topology.

When the network conditions change, for example the bandwidth availability of links changes, a re-aggregation operation needs be performed to update the advertised aggregation topology.

In an embodiment of the present invention, the re-aggregation can be performed based on a predetermined time interval. In this embodiment, a re-aggregation time interval is predetermined, and the re-aggregation can be performed periodically based on the predetermined time interval, regardless of the bandwidth change conditions of links in the intra-domain.

In another embodiment of the present invention, an event-based re-aggregation policy is adopted, that is to say, the re-aggregation is performed only when a predetermined event occurs. Preferably, a lazy re-aggregation policy can be used, i.e., the re-aggregation is performed only when a big topology change happens or the connection rejection rate reaches a predetermined threshold.

In an embodiment, the re-aggregation is performed when a predetermined connection rejection rate is reached. As an example, during a predetermined re-aggregation time interval, the re-aggregation is performed immediately when the connection rejection rate r exceeds a predetermined threshold $\alpha$, wherein $\alpha$ is a constant based on customer's QoS requirement, for example is 20%.

In another example, the re-aggregation is performed when the topology changes greatly. In this embodiment, it is assumed that the link capacity is B channels, and the number of available channels at time t is $c_t$. When the number of available channels $c_t$ at time t equals a value in a predetermined value sequence $b_k$, the re-aggregation is performed.

In a embodiment, the predetermined value sequence $b_k$ is constructed as follows: $b_k=\{0, L_a\}$, i.e., the re-aggregation is performed when the number of available channels $c_t$ become 0 or $L_a$.

In another embodiment, the predetermined value sequence $b_k$ has more elements so that topology re-aggregation occurs at a lower frequency when there are more available channels and occurs at a higher frequency when there are less available channels. For example, the predetermined value sequence $b_k$ can be obtained by the following formula:

$$b_k = \begin{cases} 0 & k = 0 \\ L_a & k = 1, 2, \ldots, L_a \\ L_a + _a^{k-L_a} & k = L_a + 1, \ldots K \end{cases} \quad \text{formula (13)}$$

wherein K is the largest index such that $b_k<B$ for $L_a>1$ and $b_k=k$ for $L_a=1$. For example, in a case of 16 channels on each logical link, for $L_a=2$, the predetermined value sequence is $b_k=\{0, 2, 4, 6, 10, 16\}$; for $L_a=3$, $b_k=\{0, 3, 6, 12, 16\}$; and for $L_a=4$, $b_k=\{0, 4, 8, 16\}$. The foregoing formula is just an example, and other methods can be used to obtain the predetermined value sequence $b_k$.

In accordance with the re-aggregation policy of the present invention, the re-aggregation is preformed only when a big topology change occurs, and is not preformed when the topology change is small. Therefore, in the case of ensuring that aggregation topology is updated in time, the number of re-aggregation is reduced, thereby reducing the consumed resources due to the implementation of re-aggregation and improving the performance.

It can be seen from the above description that, as the present invention constructs the connectivity matrix by utilizing "link-diversity path number", which provides not only the availability information on available wavelengths but also the resource abundance information on wavelengths, thereby more detailed link information is provided for the routing decision to optimize the source allocation and thus improve the network performance. In a preferred embodiment, the obtained full-mesh topology is further compressed, thereby reducing the amount of information to be exchanged among domains and further improving the performance. In a preferred embodiment, the full-mesh topology is compressed into a bi-directional shuffle-net topology to reduce the number of links significantly, thereby reducing the amount of routing information needing to be exchanged among domains and improving the performance. In another preferred embodiment, the re-aggregation is performed by utilizing an event-based lazy re-aggregation policy, thereby reducing the consumed resources due to the implementation of re-aggregation and improving the performance.

Next, an apparatus for topology aggregation of the present invention will be further described hereinafter.

Figure 9:
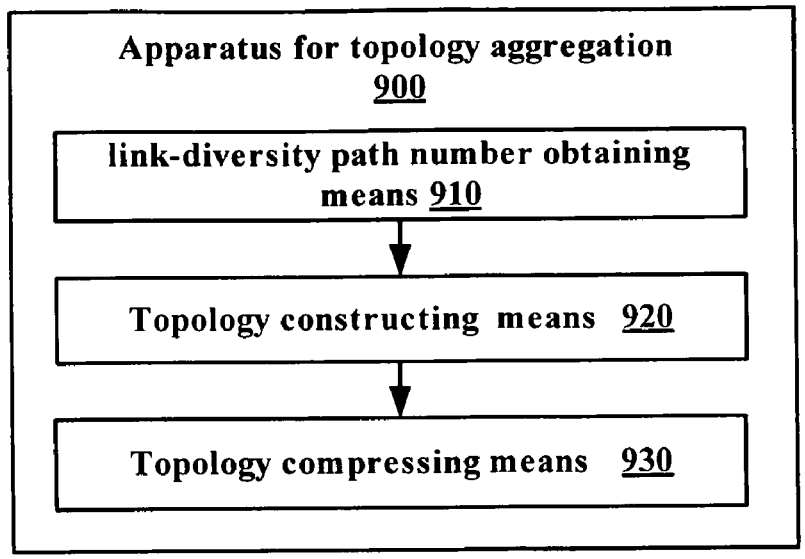
FIG. 9 shows a schematic block diagram of an apparatus for topology aggregation according to an embodiment of the present invention.

FIG. 9 shows an apparatus 900 for topology aggregation according to an embodiment of the present invention. As shown in FIG. 9, the apparatus 900 for topology aggregation includes: link-diversity path number obtaining means 910 configured to obtain the link-diversity path number $c(i,j,\lambda_k)$ between each pair of border nodes in a real topology; and topology constructing means 920 configured to obtain a connectivity matrix C by using the link-diversity path number $c(i,j,\lambda_k)$ and construct a corresponding full-mesh topology $G_B$.

The link-diversity path number obtaining means 910 can operate in accordance with the above description with respect to steps 210-230: an adjacent matrix is first computed from the real topology of a domain, and then the link-diversity path number between border nodes is obtained by calculating the maximum flow between border nodes. The highest-label-preflow-push algorithm, the Augmenting Path Algorithm, and other algorithms known to the skilled in the art can be used when computing the link-diversity path number.

The topology constructing means 920 can operate in accordance with the above description with respect to step 240: the connectivity matrix is constructed using the link-diversity path number obtained by the link-diversity path number obtaining means 910.

From the above embodiment, it can be seen that the apparatus 900 for topology aggregation of the present invention constructs the connectivity matrix using the link-diversity path number, which provides not only the information on available wavelengths but also the resource information on the abundance degree of wavelengths, thereby facilitating the route selection and improving the performance.

In a preferred embodiment, the apparatus 900 for topology aggregation further includes topology compressing means 930 configured to compress the full-mesh topology, thereby further reducing the amount of information to be exchanged among domains.

Figure 10:
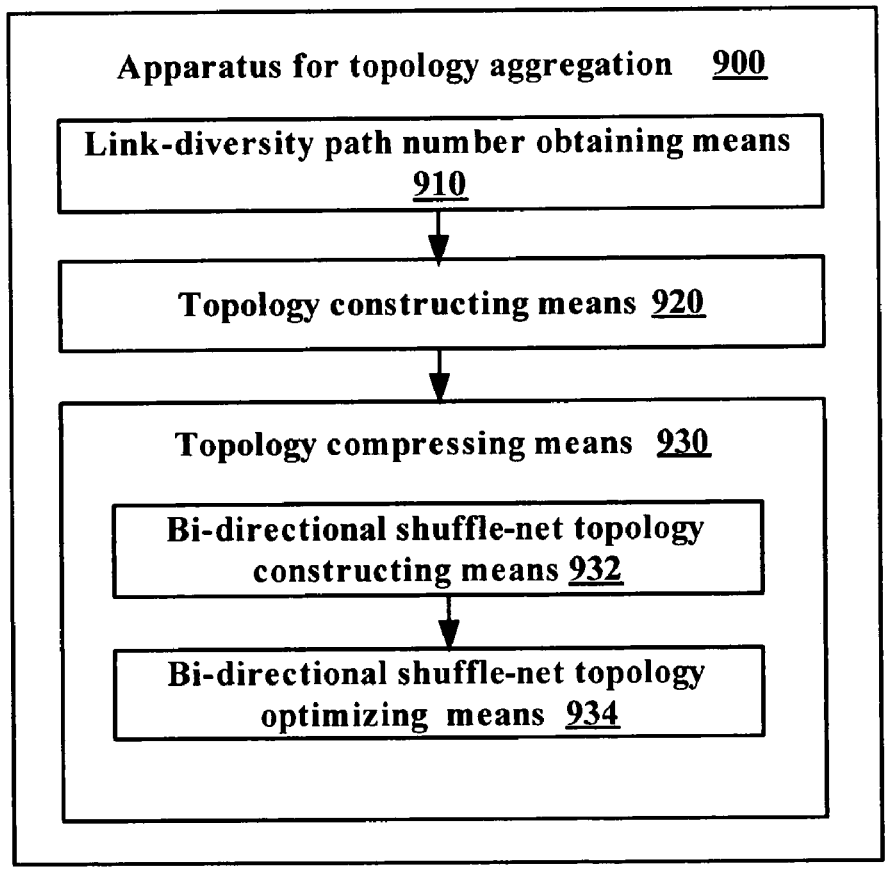
FIG. 10 shows a schematic block diagram of an apparatus for topology aggregation according to another embodiment of the present invention.

As shown in FIG. 10, in an embodiment, the topology compressing means 930 includes: bi-directional shuffle-net topology constructing means 932 configured to initialize a bi-directional shuffle-net topology using determined structural parameters of the bi-directional shuffle-net topology; and bi-directional shuffle-net topology optimizing means 934 configured to optimize the bi-directional shuffle-net topology using the connectivity matrix of the full-mesh topology.

Figure 11:
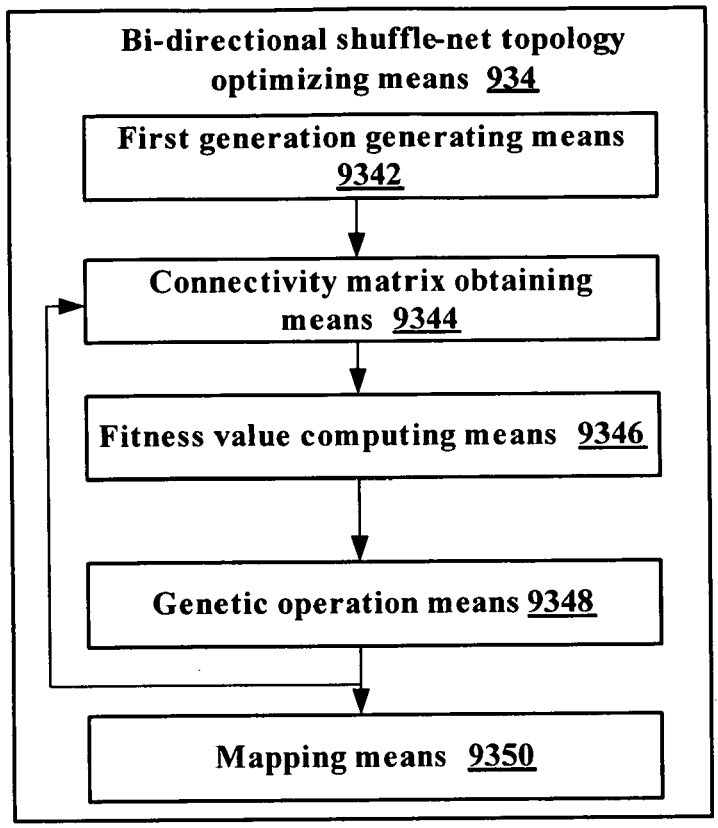
FIG. 11 shows a schematic block diagram of bi-directional shuffle-net topology optimizing means in an apparatus for topology aggregation according to another embodiment of the present invention.

The bi-directional shuffle-net topology optimizing means 934 can further optimize the bi-directional shuffle-net topology based on the genetic algorithm. FIG. 11 shows an embodiment of the bi-directional shuffle-net topology optimizing means 934 based on the genetic algorithm. The bi-directional shuffle-net topology optimizing means 934 includes: first generation generating means 9342 configured to obtain a first generation of the bi-direction shuffle-net topology randomly; connectivity matrix obtaining means 9344 configured to obtain the connectivity matrix of chromosome of the current generation; fitness value computing means 9346 configured to compute the fitness value of each chromosome of the current generation using the connectivity matrix of border nodes of the real topology as a target function; genetic operation means 9348 configured to perform genetic operations on the chromosomes in the current generation based on the fitness value to obtain the chromosomes of the next generation, wherein the genetic operations includes a selection operation, a mutation operation, a crossover operation, and the like; and mapping means 9350 configured to, when a condition terminating the genetic operations is met, map the nodes of the full-mesh topology and the logical links into the bi-directional shuffle-net topology by utilizing the resulting optimized chromosome. Furthermore, other suitable algorithms known to the skilled in the art, such as the heuristic algorithm and the like, can also be used to optimize the bi-directional shuffle-net topology.

In an embodiment, the fitness value computed by the fitness value computing means 9346 is the absolute of the difference between the connectivity matrix of chromosome of said current generation and that of border nodes of the real topology. While in another embodiment, the fitness value is the absolute value of the ratio of the difference to the sum between the connectivity matrix of chromosome of said current generation and that of border nodes of the real topology.

In an embodiment, the condition terminating the genetic operations is that the number of iteration exceeds a predetermined value or the fitness value reaches a predetermined value.

In an embodiment, the chromosome is based on one-dimensional literal permutation encoding.

From the above embodiment, it can be seen that the number of the logical links is reduced significantly and the more accurate topology structure is provided by further optimizing the bi-directional shuffle-net topology utilizing the genetic algorithm, thereby improving the performance.

Figure 12:
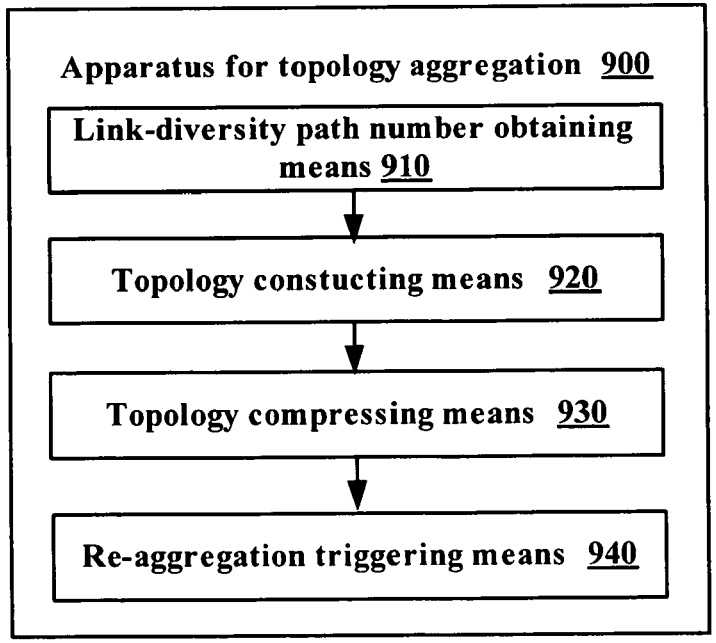
FIG. 12 shows a schematic block diagram of an apparatus for topology aggregation according to another embodiment of the present invention.

In a preferred embodiment, as shown in FIG. 12, the apparatus 900 for topology aggregation further includes a re-aggregation triggering means 940 configured to trigger a re-aggregation of topology when the network status changes or trigger a re-aggregation of topology based on a predetermined time interval. In an embodiment, based on a lazy re-aggregation policy, the re-aggregation triggering means 940 triggers the re-aggregation when a predetermined topology change event occurs or the connection rejection rate reaches a predetermined threshold. The predetermined topology change event can be an event that the amount of available resources increases or decreases to a predetermined value, and the re-aggregation occurs at a lower frequency when there are more available resources and occurs at a higher frequency when there are less available resources.

Figure 13:
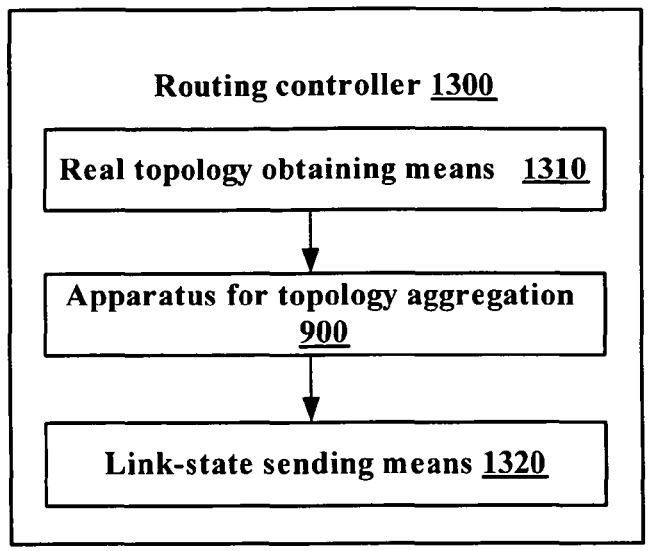
FIG. 13 shows a schematic block diagram of a routing controller according to an embodiment of the present invention.

Besides, the present invention also provides a routing controller. FIG. 13 shows a schematic block diagram of a routing controller according to an embodiment of the present invention. As shown in FIG. 13, the routing controller 1300 includes: real topology obtaining means 1310 for obtain a real topology of one domain, the apparatus 900 for topology aggregation of the present invention for aggregating the real topology of one domain, and link-state sending means 1320 for generating the Link-State Advertisement (LSA) information based on the topology obtained by the apparatus 900 for topology aggregation, and for sending the LSA information out. The apparatus 900 for topology aggregation in the routing controller constructs the connectivity matrix using the link-diversity path number, which provides not only information on available wavelengths, but also resource information on wavelengths, thereby facilitating route selection and improving the performance.

Figure 14:
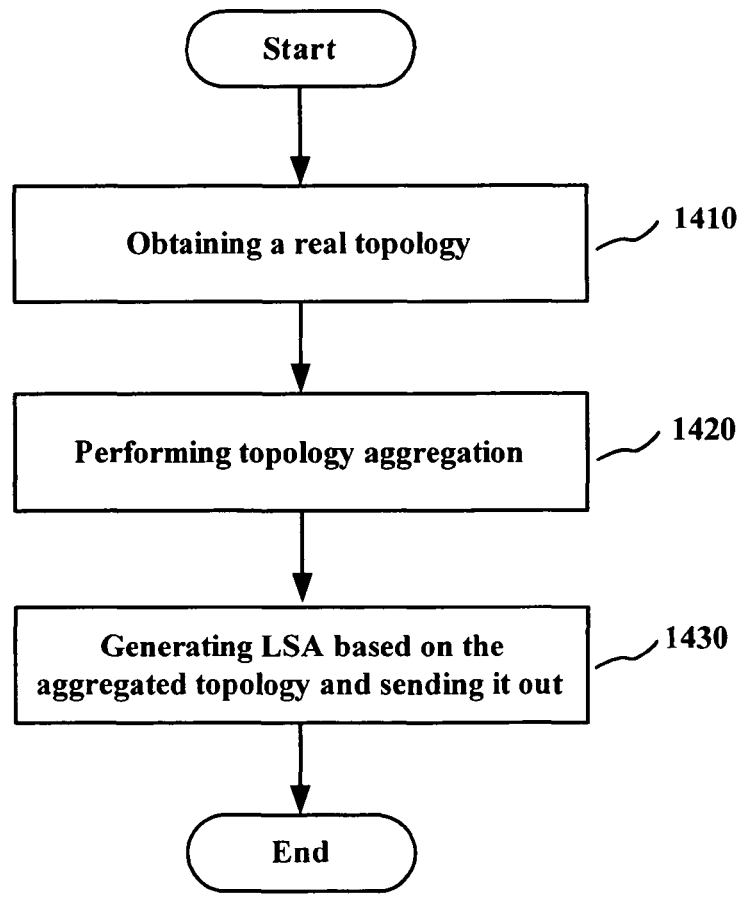
FIG. 14 shows a starting phase flowchart of a routing controller according to an embodiment of the present invention.

FIG. 14 shows a flowchart of a starting phase process of a routing controller according to an embodiment of the present invention. As shown in FIG. 14, after the routing controller starting to operate, the real topology obtaining means first obtains a real topology of one domain at step 1410. At step 1420, the apparatus for topology aggregation then aggregates the real topology. Next at step 1430, the link-state sending means generates LSA information based on the aggregated topology and sends it out.

In the working phase, the apparatus for topology aggregation will trigger a re-aggregation when a re-aggregation condition is met. The re-aggregation can be triggered when the network status changes or triggered based on a predetermined time interval. In an embodiment, based on a lazy re-aggregation policy, the re-aggregation is triggered when a predetermined topology change event occurs or the connection rejection rate reaches a predetermined threshold. Besides, the predetermined topology change event can be an event that the amount of available resources increases or decreases to a predetermined value, and the predetermined event occurs at a lower frequency when there are more available resources and occurs at a higher frequency when there are less available resources.

Figure 15:
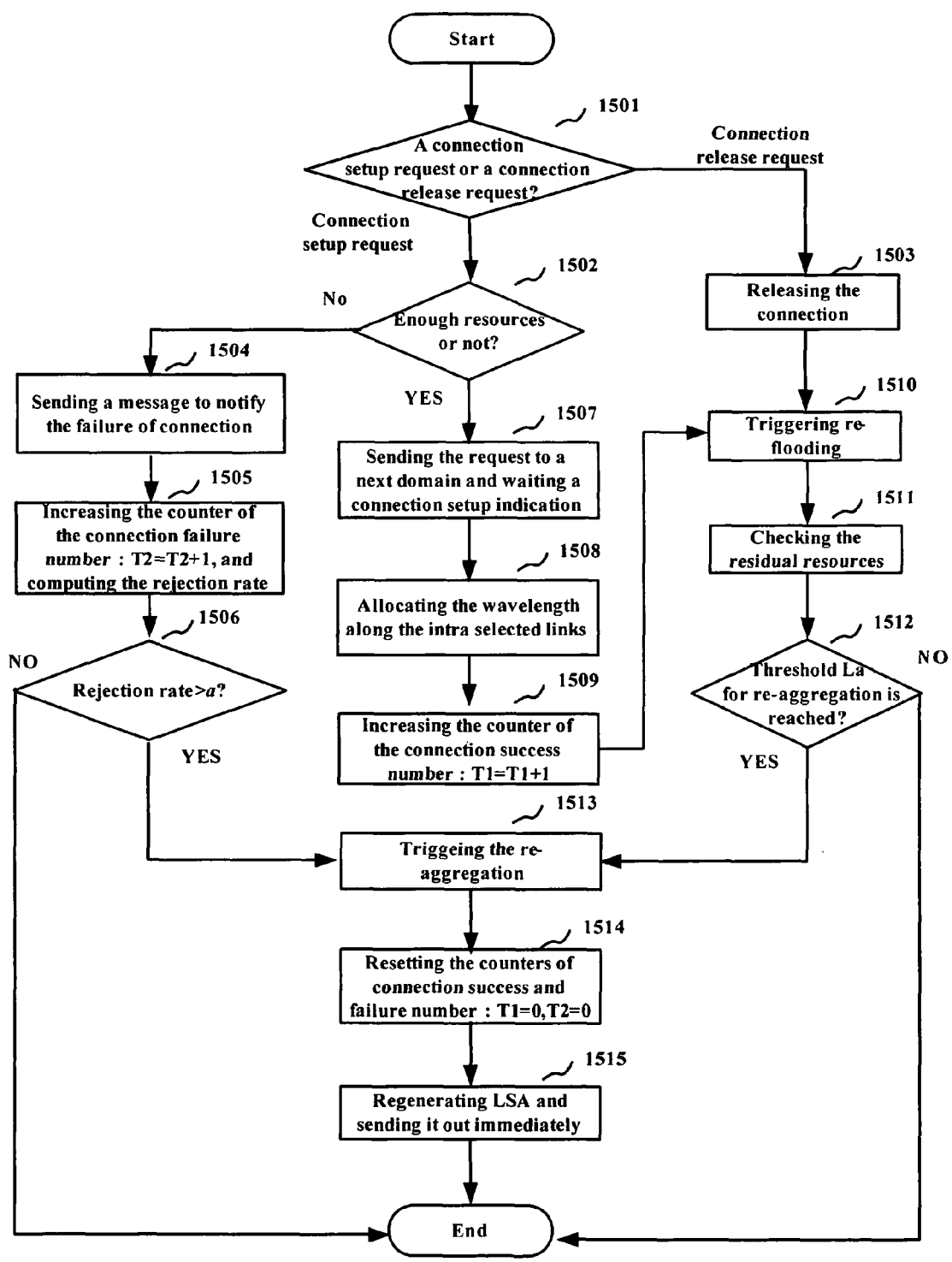
FIG. 15 shows a working phase flowchart of a routing controller according to an embodiment of the present invention.

FIG. 15 shows a flowchart of a working phase process of a routing controller according to an embodiment of the present invention.

As shown in FIG. 15, at the working phase, when a request message is received, it is first determined that the request is a connection setup request or a connection release request at step 1501. If it is a connection setup request, the process proceeds to step 1502.

At step 1502, the resources between the designated entrance and exit nodes are checked, and if the check shows that there are no enough resources between the designated entrance and exit nodes to support the connection request, the process proceeds to step 1504. At step 1504, a message is sent to the requestor to notify the requestor the failure of the request. At step 1505, the failure number is then increased by 1, and the rejection rate of connections, i.e., the failure number/(the failure number+the success number) is computed.

Next, at step 1506, it is determined whether the rejection rate reaches a predetermined threshold of the rejection rate. If the predetermined threshold is reached, then the re-aggregation is triggered at step 1513 to perform the topology re-aggregation. After this, at step 1514, the counts of the success and failure of connections are reset to count again. Then at step 1515, LSA is generated based on the re-aggregated topology, and sent out. Thus a process for a request is over.

On the other hand, if at step 1502 the check shows that there are enough resources between the designated entrance and exit nodes to support the connection request, the process proceeds to step 1507. At step 1507, the request is sent to a next domain, and a connection setup indication is waited.

After receiving the indication, at step 1508, the wavelength is allocated along the intra selected links to setup a connection. After this, at step 1509, the success number of connections is increased by 1. Then at step 1510, a re-flooding is triggered to send LSA information. Next at step 1511, the residual resources between the entrance and exit nodes are checked, and at step 1512, it is determined whether the amount of residual resources reaches a predetermined threshold of re-aggregation $L_a$ or not. If the threshold $L_a$ is reached, the process enters into step 1513 and performs the re-aggregation. After this, at step 1514 the counts of the success and failure connections are reset. The process then proceeds to step 1515 and the process for the request is terminated. If the threshold $L_a$ is not reached yet, then the process for the request is terminated directly.

In step 1501, if the request is a connection release request, the process proceeds to step 1503. At this step, the connection is released. The process goes to step 1510 subsequently, the steps as described above is performed until the process is terminated.

It will be noted that more specific technical details known to the skilled to the art, which may be necessary to the implementation of the present invention, are omitted in above description for much better understanding of the present invention.

The specification is provided for the purpose of illustration and description, but is not exhaustive or limited the invention to the disclosed form. Various modifications and alterations are apparent to the skilled in the art.

Therefore, the embodiments were chosen and described in order to best explain the principles of the invention, the practical application thereof, and to enable the skilled in the art to understand that all modifications and alterations made without departing from the spirit of the present invention fall into the protection scope of the present invention as defined in the appended claims.

What is claimed is:

1. A method for topology aggregation by a routing controller in an optical network, comprising the steps of:
   obtaining an adjacent matrix for each wavelength in used for communication within a real topology of nodes in a routing domain, communication between said nodes managed by the routing controller;
   obtaining a link-diversity path number between each pair of border nodes in the real topology from the adjacent matrices using a maximum flow algorithm;
   obtaining a connectivity matrix by utilizing said link-diversity path numbers and constructing a corresponding full-mesh topology; and
   performing topology compression on said full-mesh topology, said topology compression further comprising the steps of:
      determining structural parameters of a bi-directional shuffle-net topology;
      initializing said bi-directional shuffle-net topology by utilizing said structural parameters; and
      optimizing said bi-directional shuffle-net topology by utilizing said connectivity matrix.

2. The method of claim 1, wherein said link-diversity path number is obtained by the step of calculating a maximum flow between border nodes.

3. The method of claim 2, wherein the step of calculating the maximum flow between border nodes is performed by the step of utilizing the highest-label-preflow-push algorithm.

4. The method of claim 1, wherein the step of optimizing said bi-directional shuffle-net topology is based on a genetic algorithm, and further comprises the steps of:
   obtaining a first generation of said bi-directional shuffle-net topology randomly;

obtaining a connectivity matrix of a topology of a chromosome of a current generation;

computing a fitness value for each chromosome of the current generation using the connectivity matrix of border nodes in the real topology as a target function;

performing genetic operations on each chromosome of the current generation based on said fitness value to obtain chromosomes of the next generation;

repeating the steps of obtaining the connectivity matrix of the topology of the chromosome, computing the fitness value, and performing the genetic operations until a condition terminating the genetic operations is met; and mapping nodes of the full-mesh topology into the bi-directional shuffle-net topology by utilizing a resulting chromosome to obtain an optimized bi-directional shuffle-net topology.

5. The method of claim 4, wherein said fitness value is an opposite of a sum of each deviation value, said each deviation value being an absolute value of a ratio of a difference to the sum between the connectivity matrix of the topology of the chromosome and the connectivity matrix of said full-mesh topology.

6. The method of claim 4, further comprising the step of terminating the genetic operations when a number of an iteration reaches a predetermined value.

7. The method of claim 4, wherein said chromosome utilizes one-dimensional literal permutation encoding.

8. The method of claim 1, further comprising the step of performing a re-aggregation of topology when the network status changes.

9. The method of claim 8, wherein the re-aggregation of topology is based on a lazy re-aggregation policy and is performed when a predetermined topology change event occurs or the connection rejection rate reaches a predetermined threshold.

10. The method of claim 9, wherein said predetermined topology change event is an event that an amount of available resources becomes a predetermined value, and said predetermined topology change event occurs at a lower frequency when there are more available resources and occurs at a higher frequency when there are less available resources.

11. An apparatus for topology aggregation of nodes in an optical network, comprising:
 a link-diversity path number obtaining means configured to obtain an adjacent matrix for each wavelength in a real topology and obtain a link-diversity path number between each pair of border nodes in the real topology from the adjacent matrices using a maximum flow algorithm;
 a topology constructing means configured to obtain a connectivity matrix by using said link-diversity path numbers and construct a corresponding full-mesh topology; and
 a topology compression means configured to perform topology compression on said full-mesh topology, said topology compression performing steps comprising:
  determining structural parameters of a bi-directional shuffle-net topology;
  initializing said bi-directional shuffle-net topology by utilizing said structural parameters; and
  optimizing said bi-directional shuffle-net topology by utilizing said connectivity matrix.

12. A routing controller, comprising:
 an apparatus for topology aggregation comprising:
  a link-diversity path number obtaining means configured to obtain an adjacent matrix for each wavelength in a real topology and obtain a link-diversity path number between each pair of border nodes in the real topology from the adjacent matrices using a maximum flow algorithm;
  a topology constructing means configured to obtain a connectivity matrix by using said link-diversity path numbers and construct a corresponding full-mesh topology; and
  a topology compression means configured to perform topology compression on said full-mesh topology, said topology compression means performing steps comprising:
   determining structural parameters of a bi-directional shuffle-net topology;
   initializing said bi-directional shuffle-net topology by utilizing said structural parameters; and
   optimizing said bi-directional shuffle-net topology by utilizing said connectivity matrix; and
 a link-state sending means configured to a) generate Link-State Advertisement (LSA) information based on the topology obtained by the apparatus for topology aggregation and b) send said LSA information out.

* * * * *